United States Patent [19]
Philyaw

US005772307A

[11] Patent Number: 5,772,307
[45] Date of Patent: Jun. 30, 1998

[54] AUTOMOBILE SPEAKER COVER

[75] Inventor: Michael L. Philyaw, Williamston, S.C.

[73] Assignee: Rogers Stereo, Greenville, S.C.

[21] Appl. No.: 666,648

[22] Filed: Jun. 18, 1996

[51] Int. Cl.$^6$ .................................................. F21V 33/00
[52] U.S. Cl. ................................ 362/86; 362/80; 362/253
[58] Field of Search .................................. 362/80, 86, 87,
362/96, 253, 276, 294, 373, 802; 318/86;
84/464 R, 464 A

[56] References Cited

U.S. PATENT DOCUMENTS

| | | | |
|---|---|---|---|
| 2,083,753 | 6/1937 | Turner | 362/86 |
| 2,501,968 | 3/1950 | Sassin | 362/253 |
| 4,875,143 | 10/1989 | Fernandez | 362/253 |

FOREIGN PATENT DOCUMENTS 2155797  10/1985  United Kingdom ................. 84/464 R Primary Examiner—Y My Quach
Attorney, Agent, or Firm—Cort Flint

[57] ABSTRACT

A speaker device for attachment to a rear hub of the speaker basket of an automobile speaker including a cover member for being placed over the periphery of the rear hub of the automobile speaker and a peripheral attachment included in the cover member for receiving an outer periphery of the rear hub. An engaging element carried by the peripheral attachment engages the rear hub retaining the cover member with the rear hub. A light source carried by the cover member is in electrical connection with the leading ground wires of the speaker for illuminating when the automobile speaker is operating.

20 Claims, 4 Drawing Sheets

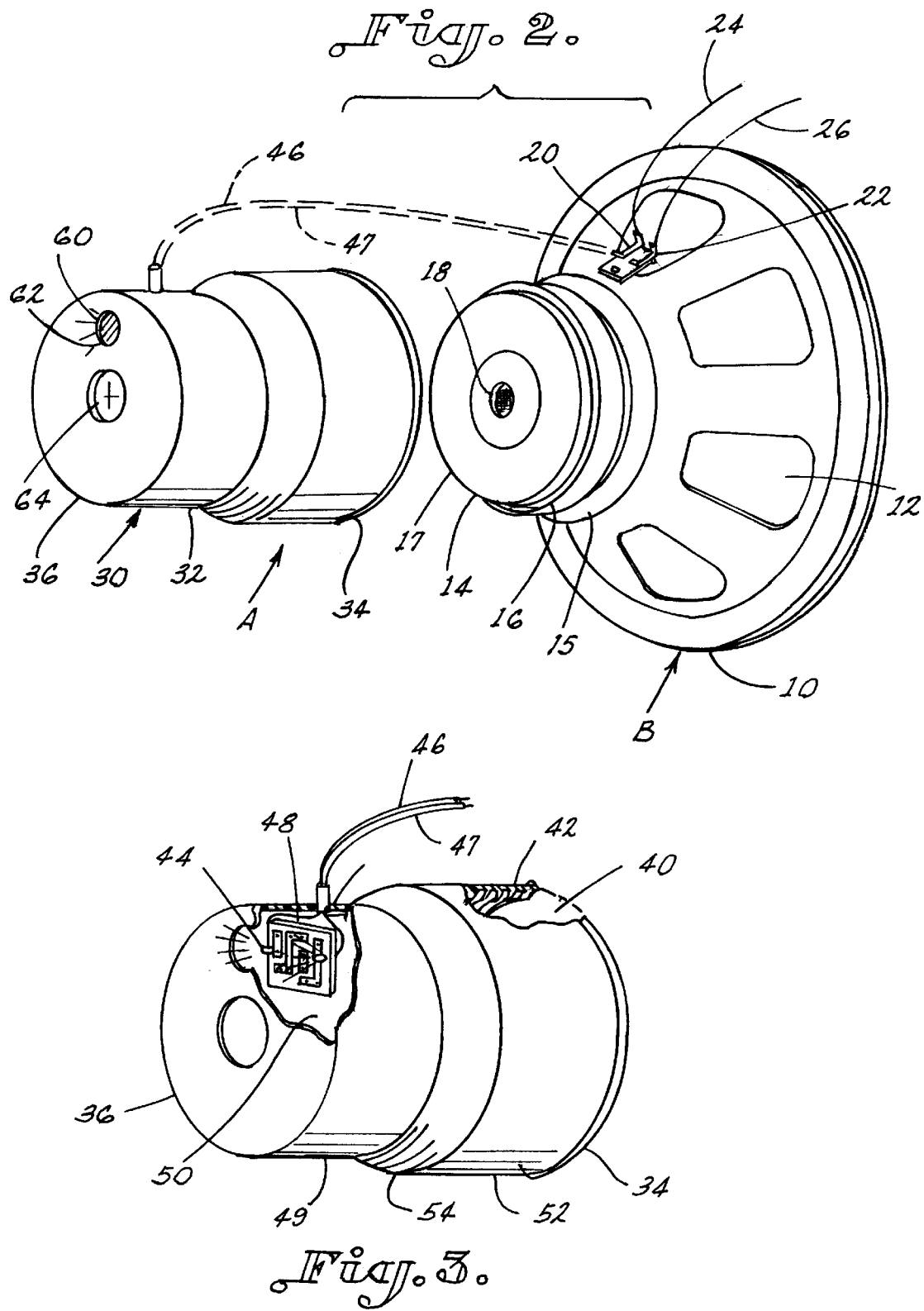

AUTOMOBILE SPEAKER COVER

BACKGROUND OF THE INVENTION

This invention relates to audio speakers, and more particularly, to an automobile speaker cover for the rear basket hub of an automobile speaker which covers the hub and illuminates when the automobile speaker is operating.

Accessories for automobiles are extensive. Some accessories involve connecting light sources to automobiles. For instance, some automobile owners have attached neon light devices to the bottom of their automobiles which create a glow underneath the car during driving. The general use of lights for automobile speakers is disclosed in U.S. Pat. No. 4,875,143, which discloses a relatively complex rotating light circuit and speaker cover for attachment over the front cone of the speaker inside the interior of an automobile.

United Kingdom patent application GB 2155 797 discloses a loudspeaker with light emitting bulbs which are arranged around the circumference of the speaker and which are driven by the audio signal utilizing transistors. The lighting portion is integral with the loudspeaker and designed as a single unit.

Both U.S. Pat. No. 4,875,143 and United Kingdom Patent Application No. GB 2155 797 are intended to surround the front portion of the speaker cone. Additionally, both of these prior devices are fragile and would not withstand the air pressure created by larger speakers including woofers which range in diameter from six to eighteen inches.

With the advent of intricate and large automotive speaker assemblies, many audiophiles invert the speakers to display the large baskets and hubs associated with the speakers. Also, during automotive audio shows, the trunk of the automobile is raised to display the large baskets. Furthermore, at recreational areas, it is common to raise the trunk of an automobile so the music from the rear speakers may be heard. The prior art lighting devices for speakers are not suitable for illuminating and/or protecting the basket hub of an automotive speaker.

Accordingly, it is an object of the present invention to provide a cover for the rear basket hub which may be illuminated when the speaker is operating;

Also, it is an object of the present invention to provide a cover which is easily attached to the rear basket hub of an automobile speaker which will illuminate when the speaker is operating;

Furthermore, it is an object of the present invention to provide a decorative and protective cover for the rear basket hub which protects the rear basket hub from scaring and which will illuminate when the speaker is operating.

SUMMARY OF THE INVENTION

The above objectives are accomplished according to the present invention by providing a speaker device for attachment to a rear hub of the speaker basket of an automobile speaker. The rear hub includes a housing having a magnet carried about the hub housing. Lead and ground wires are operatively connected to the speaker for operating the speaker.

The device includes a cover member for being placed over the outer periphery of the rear hub at least along a general length of the rear hub. A peripheral attachment is included in the cover member and terminates at an outer edge for defining an open cap end which is designed to receive an outer periphery of the rear hub. An engaging element is carried by the peripheral attachment which is designed for engaging the rear hub for retaining the cover member with the rear hub. A light source is carried by the cover member for illuminating when the speaker is operating. Electrical leads electrically connect the light source with the lead and ground wires of the speaker enabling the light source to illuminate when the automobile speaker is operating.

The cover member and peripheral attachment frame support are constructed and arranged to attach to the hub for supporting the light source with respect to the hub so that the light source projects an illumination generally near the hub when the speaker is operating.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is an exploded view of a speaker cover aligned for attachment to the rear hub of an automobile speaker according to the invention;

FIG. 3 is a cut away view of the speaker cover exposing the LED and printed circuit board and serrated ridges according to the invention;

DESCRIPTION OF A PREFERRED EMBODIMENT

Figure 1:
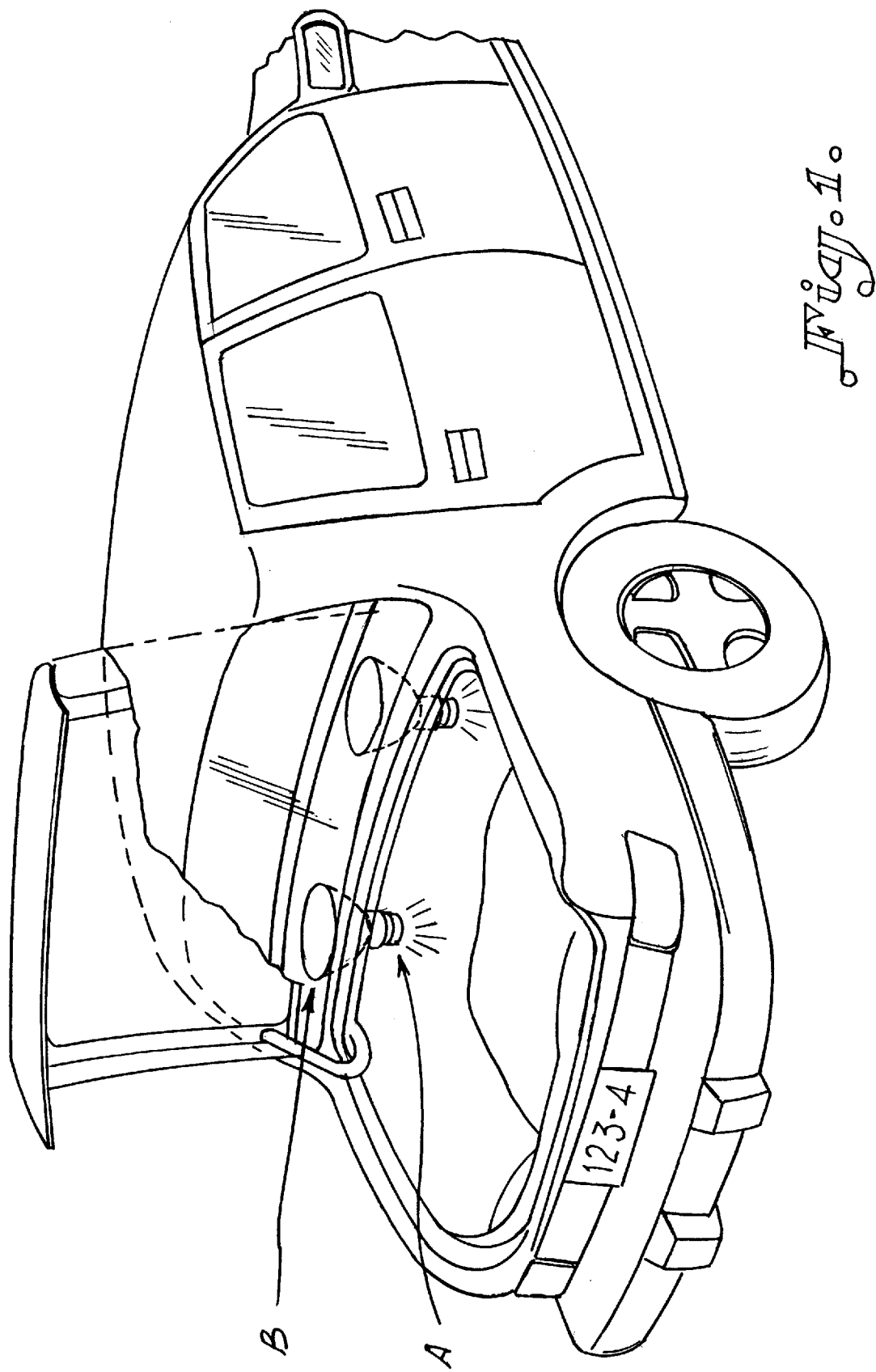
FIG. 1 is a perspective view of a pair of speaker covers attached to a pair of rear automobile speakers according to the invention.
Figure 4:
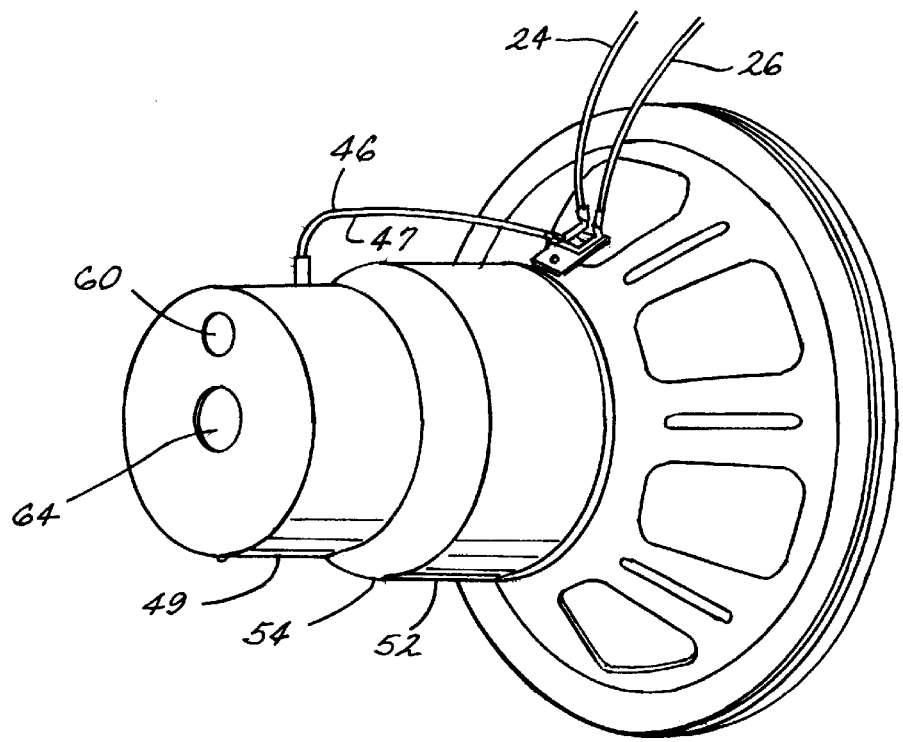
FIG. 4 illustrates a speaker cover attached over the rear hub of an automobile speaker according to the invention.

Referring now in more detail to the drawings, the invention will now be described in more detail. As shown in FIGS. 1, 2, 4,5, and 6 speaker cover A is attached to automobile speaker B. Automobile speaker B is a standard automobile speaker or woofer which includes basket 10, speaker cone 12 which is housed within basket 10 and rear hub 14. Rear hub 14 is comprised of a first hub member 15 and second hub member 17 forming a housing. A voice coil (not shown) is carried within hub housing. Annular magnet 16 encircles the hub housing. Speaker B may range in diameter from six to eighteen inches having magnets of various sizes. For instance, a speaker having a twelve inch diameter may have a magnet five inches in diameter. Quality speakers permit air to flow into the speaker cone. Accordingly rear hub 14 includes an air passage (not shown) which communicates with ventricle 18 providing air flow to be breathed and exhaled into speaker cone 12 enabling the speaker cone to vibrate resonating sound. Positive and negative terminals 20 and 22, are also attached to speaker B for connecting with a lead and ground wire 24, 26 from a power source (not shown). Speaker cover A is designed to attach over rear hub 14 and preferably magnet 16.

Generally, rear hub 14 and magnet 16 are circular. Accordingly, in the preferred embodiment, speaker cover A is circular and references will be made to an annular structure. Of course different size covers may be manufactured to fit hubs of other configurations.

Speaker cover A includes cover member 30 which in the preferred embodiment is a hollow cap having an interior for being placed over the outer periphery of rear hub 14 at least along a general length of rear hub 14. Peripheral attachment 32 which is included in cover member 30 extends outward from the rear of cover member 30 and terminates at an outer edge 34 which defines an open cap end for receiving an outer periphery of outer hub 14. In the preferred embodiment, when cover member 30 is a cap, peripheral attachment 32 is an annular sidewall. In the preferred embodiment, cover plate 36 defines base of the hollow cap and peripheral attachment 32 is a peripheral side wall which is integral with and extends from cover plate 36. The peripheral side wall terminates at outer edge 34 for defining open cap end 40 for receiving the outer periphery of rear hub 14 into the interior of cap 30. Engaging element 42 is carried by peripheral attachment 32 for engaging rear hub 14 retaining cover member 30 over rear hub 14. Speaker cover A includes light source 44 for illuminating when speaker B is operating. Electrical lead 46 and ground 47 extends from light source 44 and electrically connects light source 44 with lead and ground wire 24,26 for illuminating light source 44 when speaker B is operating. In the preferred embodiment, light source 44 is comprised of light emitting diodes attached to a printed circuit board 48 from which electrical lead 46 and ground 47 are electrically connected.

As shown in FIG. 3, annular sidewall includes annular chamber wall 49 which defines annular chamber 50 of a given diameter. Annular chamber 50 is adjacent cover plate 36. Annular sidewall further defines annular skirt 52 which is of a diameter larger than annular chamber 46. Annular flange 54 defined by annular sidewall extends outward from annular chamber wall 49 to adjoin chamber wall 49 with annular skirt 52.

As shown in FIG. 3, light source 44 which is preferably a light emitting diode is carried by cover member 30. In the preferred embodiment, light source 44 is carried within annular chamber 50 to prevent accidental breakage from objects located in the trunk. Light source 44 utilizes lead wire 46 and ground wire 47 for electrical connection with lead and ground wires 24, 26 of automobile speaker B. When current is supplied to speaker B for powering speaker B, the same current is supplied to light source 44 so that light source 44 is illuminated when speaker B is operating. Peripheral sidewall defines wire channel 53 for passing lead wire 46 and ground wire 47 through cover member 30 for connecting with speaker lead wire 24 and ground wire 26.

Figure 5:
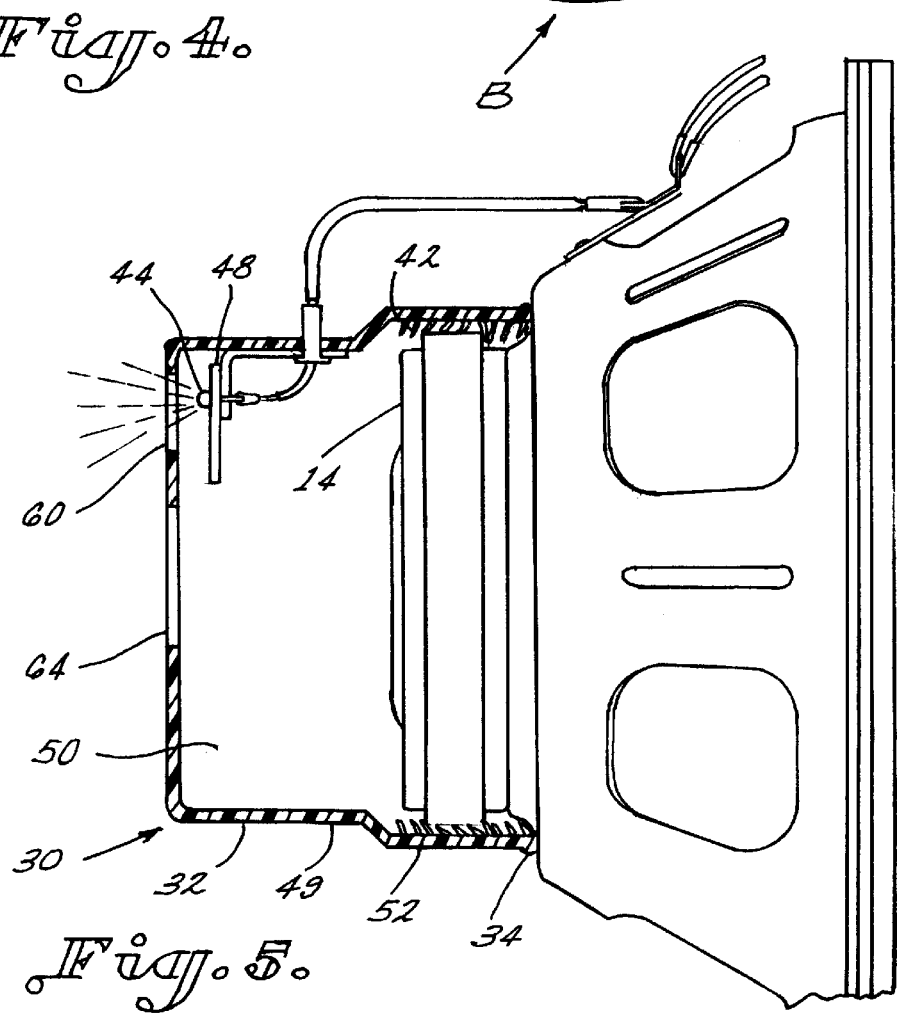
FIG. 5 is a sectional view of the speaker cover taken generally through line 4—4 of FIG. 4.
Figure 6:
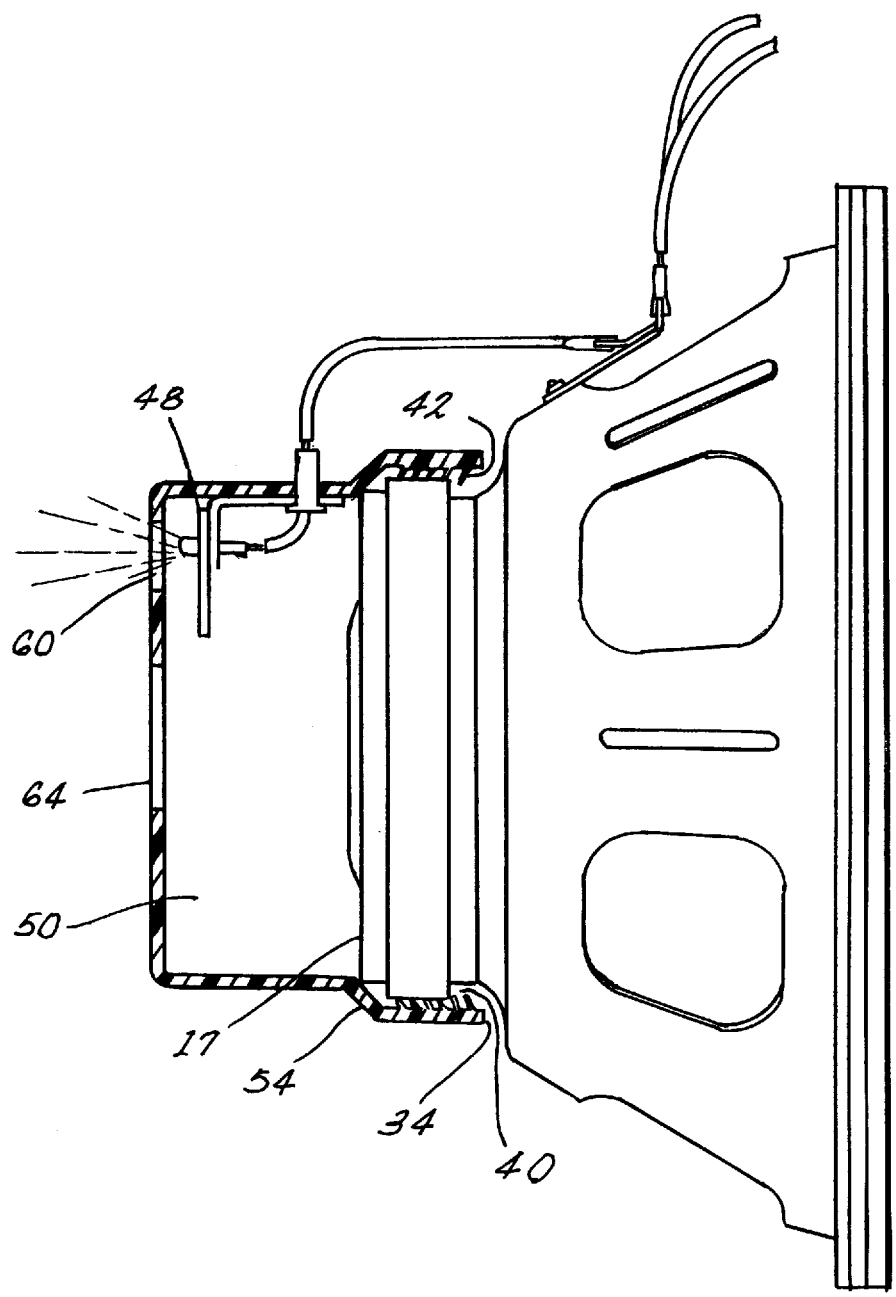
FIG. 6 illustrates a second embodiment of the invention whereby a speaker cover abuts the rear hub of the automobile speaker according to the invention.

As shown in FIGS. 3 and 5, light source 44 is carried by printed circuit board 48 within annular chamber 50. Annular skirt 52 is of a size to correspond with the size of rear hub 14 and magnet 16. As shown in FIG. 6, annular flange 54 defines an abutting surface which prevents rearward movement of rear hub thereby protecting printed circuit board 48 and light source 44 from inadvertent contact with rear hub 14 resulting in possible damage.

As shown in FIG. 5, in a separate embodiment, outer edge 34 of peripheral attachment 32 may define a speaker abutment surface for abutting the speaker thereby limiting outward movement of the rear hub within cover member 30 preventing the rear hub from making contact with light source 44 and printed circuit board 48. Accordingly, as shown in FIGS. 5 and 6, there may be various designs for preventing the movement of the rear hub into annular chamber 50 for protecting the light source and printed circuit board.

As shown in FIGS. 2, 3, 4, and 5 view port 60 is defined by cover member 30 enabling the outward illumination of light source 44 to be viewed by a person when speaker B is operating. Film sheet 62 may be dispersed across view port 60 for presenting illumination of different colors.

In the preferred embodiment, ventricle opening 64 is defined within cover member 30 permitting air flow to pass into ventricle 18 of the automobile speaker. The passing of air is required in order to enable the automobile speaker to function optimally.

In the preferred embodiment, cover member 30 is made of unitary construction molded from plastic. The exterior of annular skirt 52 includes a gripping surface for easy grasping of cover member 30 for positioning on hub 14 and over magnet 16. In the preferred embodiment, the gripping surface includes a lip 38 extending from the surface of skirt 52. Engaging element 42 is carried by peripheral sidewall for engaging rear hub 14. In the preferred embodiment, engaging element 42 includes resilient projecting ribs extending from the interior of annular skirt 52 towards the interior of cover member 30 for engaging magnet 16. The resilient projecting ribs are inclined downward in a serrated manner from the interior of annular skirt 52 towards cover plate 36. In operation, the resilient projecting ribs deform backwardly as skirt 52 is passed over magnet 16 and resume their original angled position after passing magnet 16 until a respective of the ribs contacts magnet 16 thereby retaining cover member 30 over magnet 16.

Thus, it can be seen that an advantageous construction can be had for an automobile speaker cover according to the invention where it can be readily attached to rear hub of an automobile speaker and illuminated when the automobile speaker is operating. The speaker cover is easily attached by positioning the cap over the outer periphery of the rear hub and applying force on the cap so that the engaging element may deform over the magnet and subsequently return to their original position for maintaining the speaker cover onto the rear hub. Furthermore, by providing an abutment surface accidental positioning of the cap whereby the rear hub engages the light source for damaging the light source is prevented. Such combination of a speaker cover with the rear automobile provides a novel approach for displaying a standard automobile speaker.

While a preferred embodiment of the invention has been described using specific terms, such description is for illustrative purposes only, and it is to be understood that changes and variations may be made without departing from the spirit or scope of the following claims.

What is claimed is:

1. A speaker cover for attachment to a rear hub of a speaker basket of an automobile speaker, said rear hub including a housing carrying an annular magnet, a lead and ground wire operatively connected to said speaker for operating said speaker, said cover comprising:

a hollow cap placed over an outer periphery of said rear hub at least along a general length of said rear hub;

a cover plate included in said cap covering a rear side of said rear hub;

a peripheral sidewall integral with and extending from said cover plate terminating at an outer edge defining an open cap end receiving said outer periphery of said rear hub;

an engaging element carried by said peripheral sidewall engaging said rear hub and retaining a portion of said rear hub within said hollow cap;

a light source carried by said cap; and electrical connections electrically connecting said light source with said lead and ground wires of said speaker for illuminating said light source when said automobile speaker is operating.

2. The cover of claim 1 wherein said light source is carried within an interior of said hollow cap, said cover plate forming a view port enabling illumination of said light source outwardly through the view port to be viewed by a person.

3. The cover of claim 2 including a speaker abutment surface carried by said peripheral sidewall for abutting said speaker and limiting downward movement of said rear hub within said cap preventing said rear hub from contacting said light source.

4. The cover of claim 2 including a film sheet disposed across said view port permitting viewing of said light source illumination while preventing foreign objects from entering said view port.

5. The cover of claim 1 wherein said cap is resilient and circular.

6. The cover of claim 5 wherein said sidewall is annular, said annular sidewall including an annular chamber wall defining an annular chamber for housing said light source and an annular skirt for receiving said rear hub, said annular skirt having a larger diameter than said annular chamber, said annular sidewall defining an annular flange adjoining said annular chamber wall and said annular skirt.

7. The cover of claim 6 wherein said annular flange defines an abutting surface for abutting said rear hub preventing said rear hub from engaging and damaging said light source.

8. The cover of claim 7 wherein an exterior of said annular skirt includes a contoured surface for gripping and placing said cap over said rear hub.

9. The cover of claim 7 wherein said engaging element includes resilient projecting ribs extending from an interior of said annular skirt towards the interior of said cap for engaging said magnet carried by said hub maintaining said cap on said hub.

10. The cover of claim 9 wherein said resilient projecting ribs are inclined downward from said annular skirt towards said cover plate for engaging a rim of said magnet.

11. The cover of claim 7 including a printed circuit board carried within said annular chamber electrically carrying said light source, said printed circuit board adapted for electrical connection with said lead and ground wires of said automobile speaker.

12. The cover of claim 1 wherein said cover plate includes a ventricle opening for alignment with a ventricle of said speaker, said ventricle opening permitting air flow with said ventricle.

13. The cover of claim 1 wherein said sidewall defines a wire channel and said electrical connections pass through said channel for connecting said light source with said lead and ground wires of said speaker.

14. The cover of claim 1 wherein said cap is of unitary construction molded from plastic.

15. A speaker device for attachment to a rear hub of a speaker basket of an automobile speaker, said rear hub including a hub housing having an annular magnet carried about said hub housing, a lead and ground wire operatively connected to said speaker for operating said speaker, said device comprising:

a cover member placed over an outer periphery of said rear hub at least along a general length of said rear hub;

a peripheral attachment included in said cover member terminating at an outer edge defining an open cap end receiving the outer periphery of said rear hub;

an engaging element carried by said peripheral attachment engaging said rear hub and retaining said cover member with said rear hub;

a light source carried by said cover member for electrical connection with said lead and ground wires for illuminating when said speaker is operating; and electrical connections electrically connecting said light source with said lead and ground wires of said speaker for illuminating said light source when said automobile speaker is operating.

16. The speaker device of claim 15 including a printed circuit board electrically carrying said light source, said printed circuit board adapted for electrical connection with said lead and ground wires of said automobile speaker.

17. In combination, a speaker device for attachment to an automobile speaker operated by a lead and ground wire, said combination comprising:

an automobile speaker including a rear hub;

a hub housing included in said rear hub having an annular magnet carried about said hub housing;

terminals operatively connected with said automobile speaker for terminating said lead and ground wire connected to the speaker for operating said automobile speaker;

a cover member placed over an outer periphery of said rear hub at least along a general length of said rear hub;

a peripheral attachment included in said cover member terminating at an outer edge defining an open cap end receiving the outer periphery of said rear hub;

an engaging element carried by said peripheral attachment engaging said rear hub and retaining said cover member with said rear hub;

a light source carried by said cover member for electrical connection with said lead and ground wires for illuminating when said speaker is operating; and electrical connections electrically connecting said light source with said lead and ground wires of said speaker for illuminating said light source when said automobile speaker is operating.

18. The combination of claim 17 wherein said cover is comprised of a resilient circular cap having an interior, for receiving said rear hub.

19. The combination of claim 18 wherein said peripheral attachment is annular, said peripheral attachment including an annular chamber wall defining an annular chamber for housing said light source and an annular skirt for receiving said rear hub, said annular skirt having a larger diameter than said annular chamber, said annular sidewall defining an annular flange adjoining said annular chamber wall and said annular skirt.

20. The combination of claim 17 wherein said speaker includes a ventricle formed within said hub housing, said cover member including a ventricle opening for alignment with said ventricle permitting air flow with said ventricle.

* * * * *